United States Patent [19]

Jandrasi et al.

[11] 3,976,094
[45] Aug. 24, 1976

[54] GUIDED SLIDE VALVE

[75] Inventors: Frank J. Jandrasi; Howard A. Purvis, both of Houston, Tex.

[73] Assignee: Tapco International, Inc., Houston, Tex.

[22] Filed: Jan. 13, 1975

[21] Appl. No.: 540,680

[52] U.S. Cl. .............................. 137/375; 137/240; 251/212; 251/326
[51] Int. Cl.² ......................................... F16K 3/00
[58] Field of Search ........... 137/375, 340; 251/147, 251/326, 328, 329, 212

[56] References Cited
UNITED STATES PATENTS

| | | | |
|---|---|---|---|
| 2,268,480 | 12/1941 | Hardison | 251/326 X |
| 2,636,712 | 4/1953 | Lubbock | 251/326 X |
| 2,787,438 | 4/1957 | Bauer | 251/326 |
| 3,422,997 | 1/1969 | Anderson | 251/326 X |
| 3,701,359 | 10/1972 | Worley et al. | 137/375 |
| 3,726,306 | 4/1973 | Purvis | 137/375 |

Primary Examiner—Henry T. Klinksiek
Assistant Examiner—Richard Gerard
Attorney, Agent, or Firm—Fulbright & Jaworski

[57] ABSTRACT

A guided slide valve having wear-prone internals which can be removed through the bonnet opening and which can operate in high pressure, high temperature erosive solid or fluid flow systems is disclosed which includes a body having a flow passage through it, a large internal portion closed by a removable bonnet or cover, a body portion projecting into the enlarged internal portion, preferably a cone suspended in non-external load-bearing relation with the body, the projecting portion having sides spaced from internal walls of the enlarged internal portion, a valve surface or orifice disposed on the projected body portion, preferably releasably secured, and a slide valve slideable in the enlarged internal portion adjacent the valve surface having transversely spaced side members which extend around the sides of the projecting body portion. Interfitting guides and slides are disposed on the sides of the projecting portion and on the side members of the slide valve for guiding of the slide valve to open and closed positions, and accordingly, they are disposed out of the direct flow path through the flow passage. The valve may have a single slide valve or a double slide valve arranged in end-to-end relationship for opening and closing the valve. Preferably the support cone is made of a material different from the valve body and is supported on a body ledge with a bi-metallic weld between the cone and the body that is not subject to external loads. Preferably, the body has an external shell constructed of low cost, low temperature materials and include insulation material which reduces heat flow and an erosion resistant surface or lining. Advantageously, a removable bearing sleeve with a removable insulation assembly are included in the valve. Other features are disclosed.

16 Claims, 6 Drawing Figures

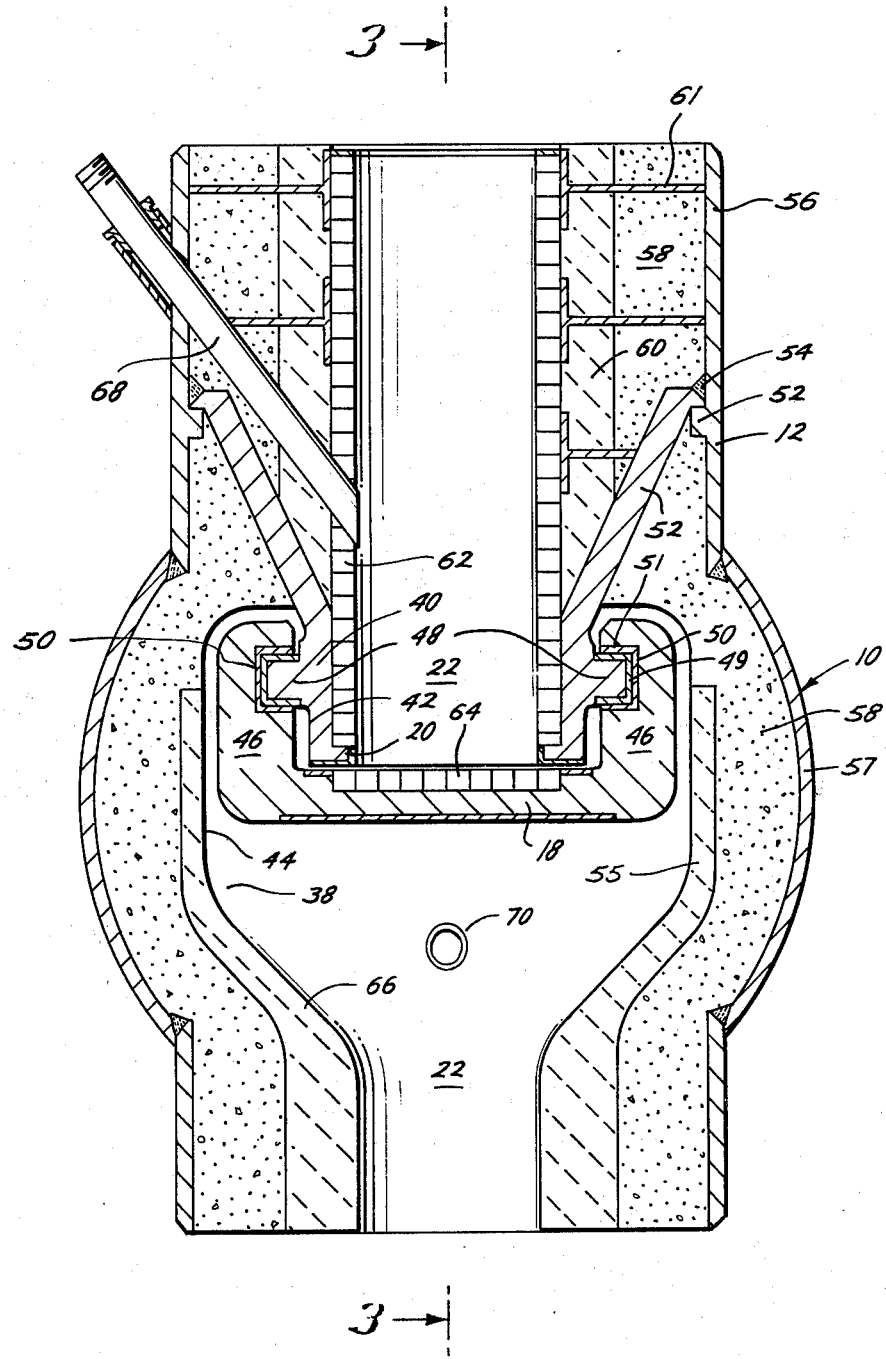

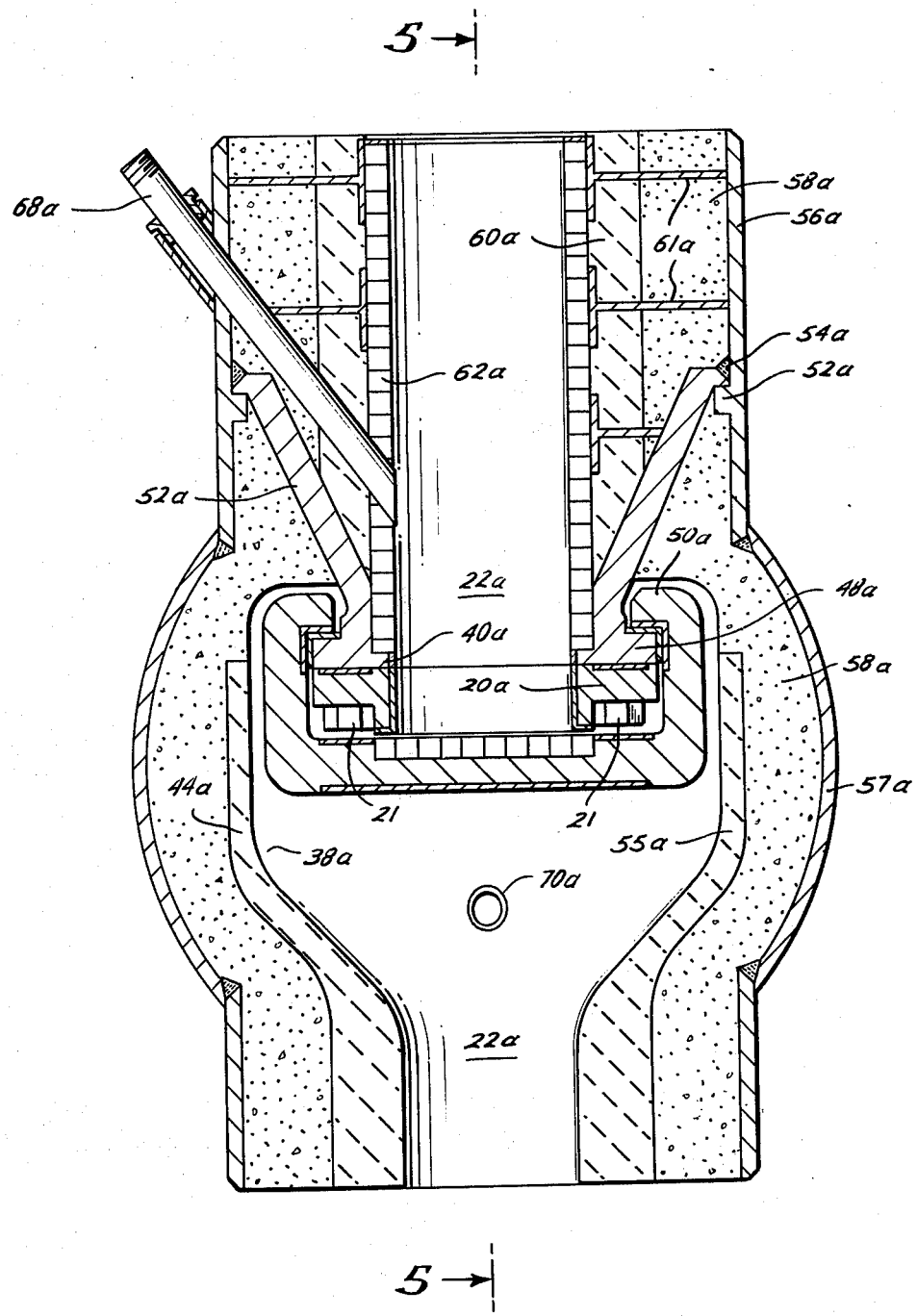

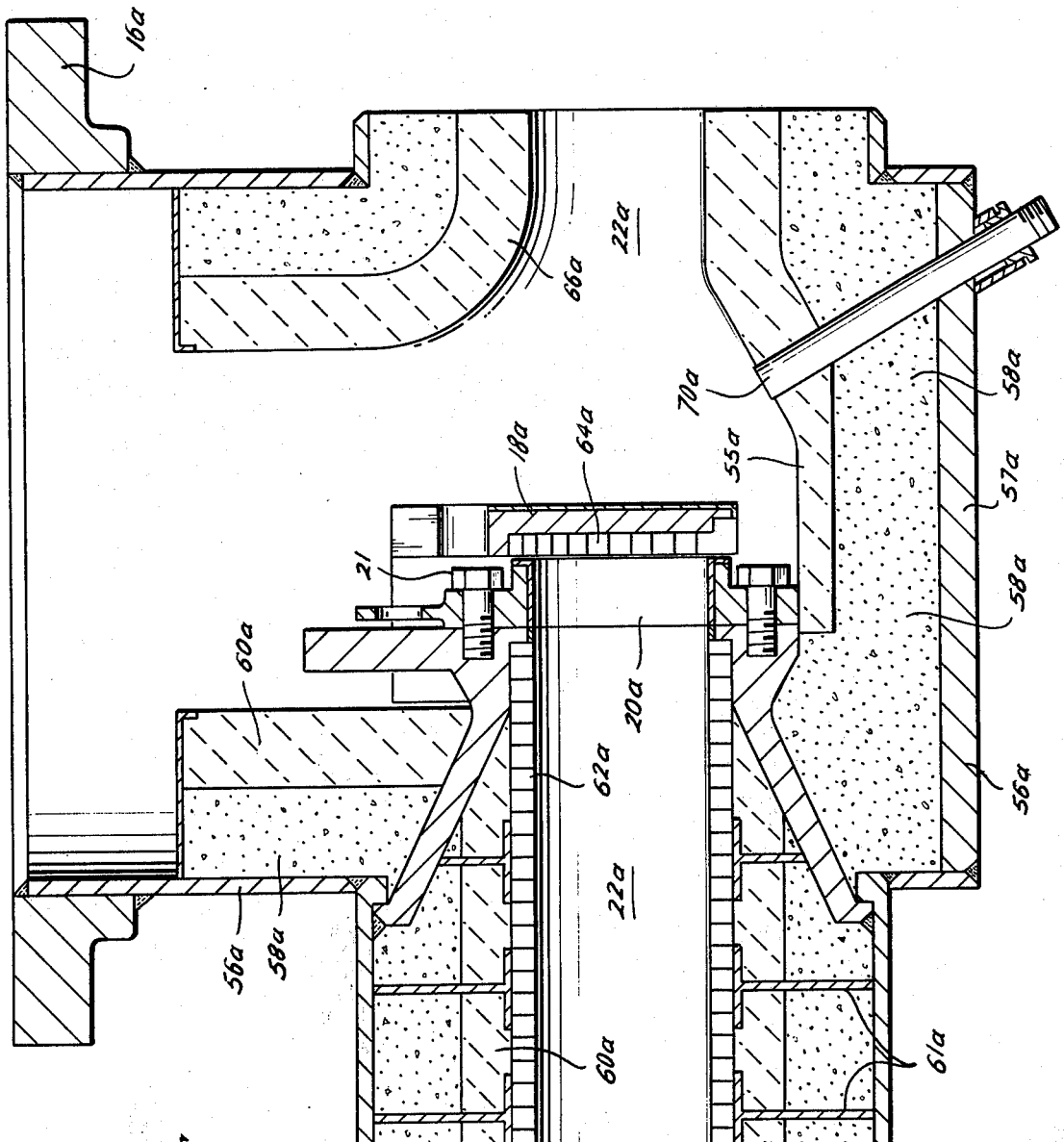

GUIDED SLIDE VALVE

BACKGROUND OF THE INVENTION

In refineries and solids handling systems there is a need for a slide valve which can operate in high pressure, high temperature erosive solid or fluid flow systems, which is of low cost and has readily removable wear-prone components with non-changing clearances without the necessity of removing the valve from the line. Slide valves currently in use have separate discs and guides with the guides bolted in the body and with clearances that can and do change.

SUMMARY

The present invention is directed to a slide valve which has low cost, wear-prone components with non-changing clearances which are readily removable without the necessity of removing the valve from the line, and in which the slide valve and the pair of slides are combined. These coact with guides on a support having a valve surface which is not subject to external loads so that clearances remain fixed regardless of temperature or pressure excursions.

The present invention is directed to such a valve which is capable of operating at high temperatures and pressures, which has guides and slides for the slide valve located out of the direct flow path through the valve, in which wear-prone parts can be removed and replaced through the bonnet opening, one which minimizes the transmission of heat from the flow stream of the valve body and whose esternal shell is constructed of low cost, low temperature materials, one which has a removable bearing sleeve with a removable insulation assembly, and one that reduces heat flow to the bonnet flange.

Accordingly, it is an object of the present invention to provide a guided slide valve in which the pair of slides are combined with the slide valve and the guides are disposed on the slides of the cooperating internal body portion of the valve seat or surface, thereby providing fixed clearances and guides and slides out of the direct flow path through the valves.

A further object of the present invention is the provision of such a slide valve which includes a support cone having a valve surface, which support cone is supported in the body in a non-external load-bearing manner to maintain clearances that remain fixed regardless of temperature or pressure excursions.

A further object of the present invention is to provide a slide valve capable of operating at high temperatures and pressures, whose external shell is constructed of low cost, low temperature materials and which minimizes the transmission of heat from the flow stream of the valve body.

A further object of the present invention is the provision of a guided slide valve which includes a body having a flow passage through it including an enlarged internal portion normally closed by a removable bonnet or cover, a body portion projecting into the large internal portion, a valve surface on the projecting body portion, a slide valve slideable in the enlarged internal portion adjacent the valve surface and having transversely spaced side members extending around sides of the projecting body portion and which is provided with interfitting guides and slides on sides of the projecting body portion and the side members operable for guiding the slide valve into open and closed position adjacent to the valve surface so that the interfitting guides and slides are disposed out of the direct flow path through the flow passage and the wear-prone slide valve and slides may be removed and repaired or replaced through the bonnet opening.

A still further object of the present invention is the provision of such a guided slide valve which utilizes a cone having a cylindrical portion upon which a valve member having a valve surface or seat is releasably secured, which is suspended in the body in external load-free relation with respect to the body, and which can be removed and repaired or replaced through the bonnet opening.

It is still a further object of the present invention to provide such a slide valve which may have either a single slide valve or a pair of slide valves arranged in end-to-end relationship for opening and closing of the valve.

Other and further objects, features and advantages will be apparent from the following description of presently preferred embodiments of the invention given for the purpose of disclosure, when taken in conjunction with the accompanying drawings.

BRIEF DESCRIPTION OF THE DRAWINGS

Like character references designate like parts throughout the several views of the drawings in which:

FIG. 2 is a cross-sectional view taken along the line 2—2 of FIG. 1, FIG. 4 is a view similar to that of FIG. 2, illustrating another embodiment of a guided slide valve according to the invention, FIG. 5 is a sectional view taken along the line 5—5 of FIG. 4.

DESCRIPTION OF THE PREFERRED EMBODIMENTS

Figures 1, 6:
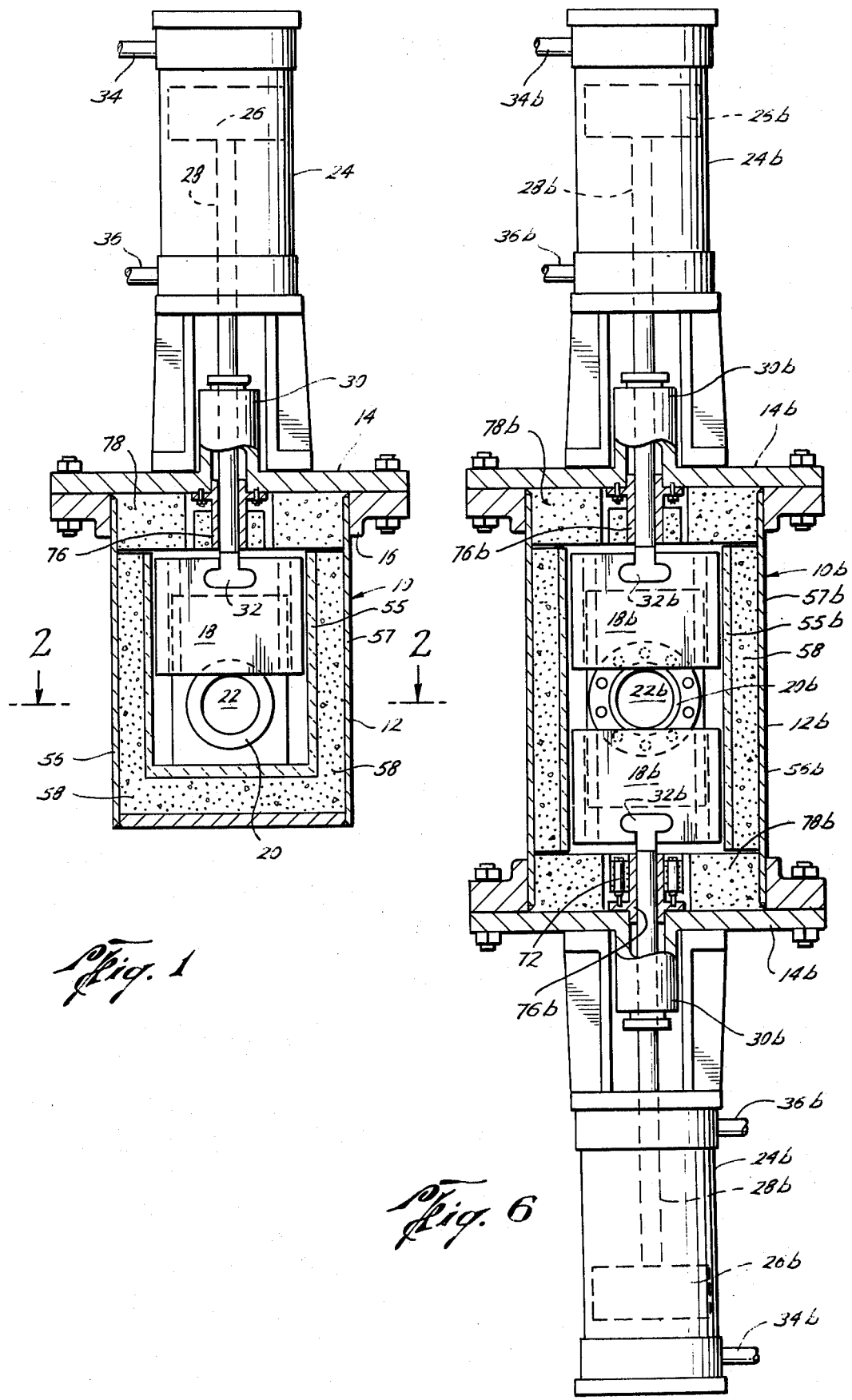
FIG. 1 is an elevational view, partly in section, of a guided slide valve according to the invention.
FIG. 6 is an elevational view similar to that of FIG. 1, illustrating a pair of slide valves and associated means for moving them into open and closed positions.

Referring now to the drawings, and particularly to FIG. 1, the reference numeral 10 generally designates the guided slide valve which includes the body 12 which is closed by the removable flanged bonnet or cover 14 bolted to the body flange 16. The bonnet or cover is of a size large enough to insert into and withdraw from the valve body the wear-prone valve internals when the bonnet or cover is removed.

Disposed within the valve body 12 is a slide valve 18 and a valve surface or seat 20, sliding movement of the slide valve 18 across the valve surface 20, opening and closing the flow passage 22 extending through the valve body 12.

Any suitable means may be provided for sliding the slide valve 18 into open and close position; however, for refinery and other commercial operations, valves of the type of the valve of the present invention are opened and closed remotely as part of valve systems. To this end, there is provided a cylinder 24 having the piston 26 and attached piston rod or actuator stem 28 which extends through the stuffing box 30 and is connected at 32 to the slide valve 18 in the usual manner. Hydraulic or pneumatic pressure is provided through the lines 34 and 36 to cause a movement of the piston 26 and thereby the stem 18 and the slide valve 18 for moving it into open and closed positions.

No more description is given or deemed necessary of the means illustrated for opening and closing the slide valve 18 and the stuffing box 30 as any desired means may be utilized—manual, hydraulic, pneumatic and the like—to open and close the valve.

Figure 3:
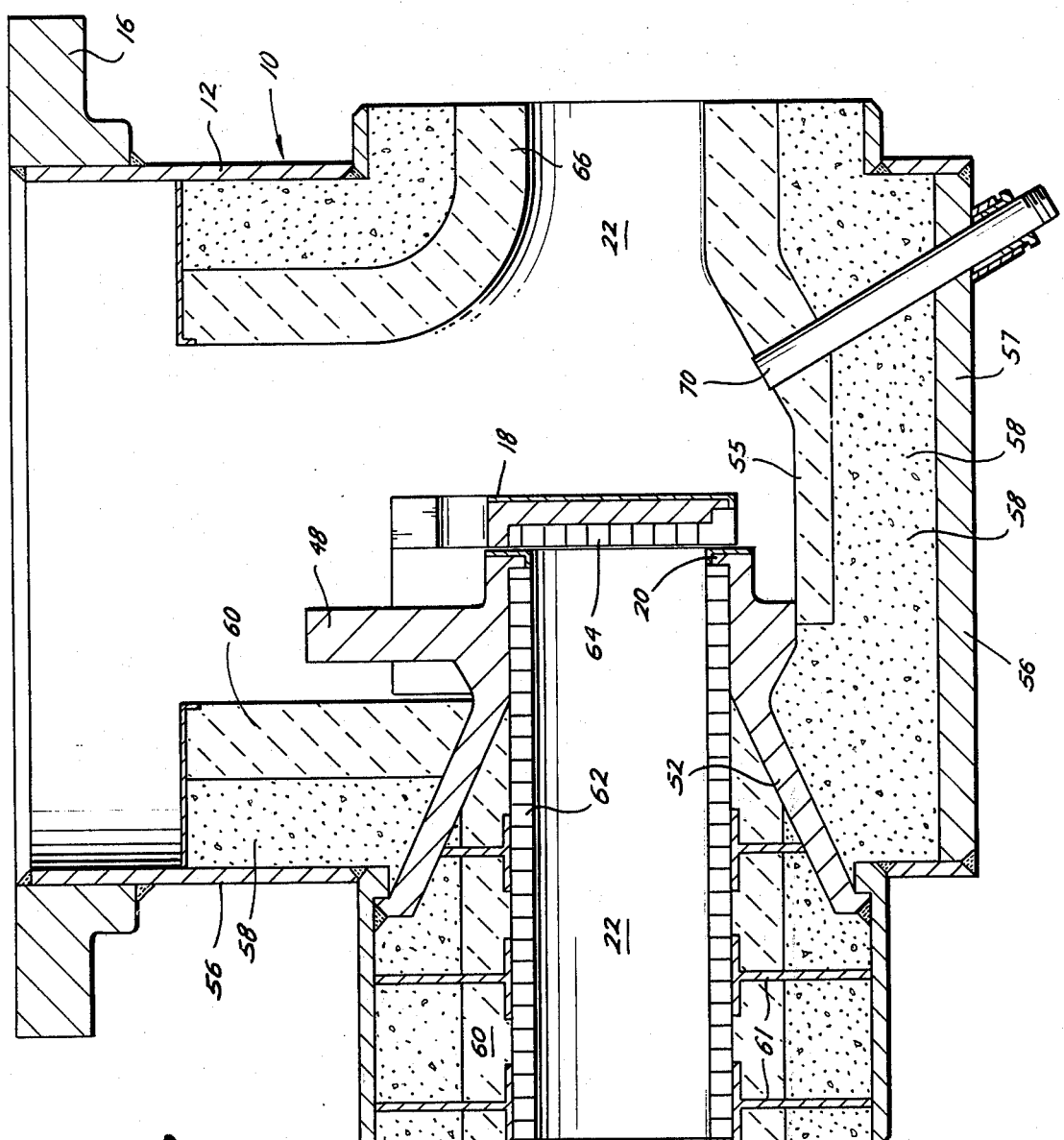
FIG. 3 is a sectional view taken along the line 3—3 of FIG. 2.

Referring now to FIGS. 2 and 3, the flow passage 22 extends through the valve body 12, as previously mentioned, which is provided with an enlarged internal portion 38 into which a body portion 40, preferably a cylindrical portion having the valve surface 20, projects which provides transversely-extending sides 42 spaced from the internal walls 44 of the enlarged portion 38.

The slide valve 18 is slideable in this enlarged internal portion 38 adjacent the valve surface 20 and includes the transversely-spaced side members 46 which extend or wrap around the sides 42 of the projecting body portion 40.

Interfitting transversely spaced pairs of guides and slides operable for guiding the slide valve 18 into open and closed position adjacent the valve surface 20 are provided and are here illustrated as spaced parallel projections 48 on opposite sides 42 of the projecting body portion 40 and interfitting grooves 50 in the side members 46 of the slide valve member 18. Thus, the slide valve 18 is guided throughout its movement by the interfitting guides 48 and slides 50 yet, at the same time, the guides and slides are disposed out of the direct flow path through the flow passage 22 in the valve body 12.

As previously mentioned, the bonnet or cover 14 is of a size which permits insertion into and removal through the bonnet opening from the valve body of the slide valve 18 with the slides 50 for repair or replacement without removing the valve from the line.

If desired, of course, the grooves and projections of slides 48 and the guides 50 may be reversed, it being an important aspect of the present invention, however, that one pair of slides is combined with the slide valve member 18 which coacts with the guides of the suspended cone 52 to provide clearances that remain fixed regardless of temperature or pressure excursions to the passage 22.

Preferably, the projecting body portion 40 in the flow passage 22 is a part of a truncated cone 52 which is suspended from the valve body 12 in a non-external load-bearing relation, such as by means of the internal annular body ledge 53 and the bi-metallic weld 54.

The body 12 comprises an outer shell 56, which can be constructed of a low cost, low temperature material such as carbon steel and includes the insulation 58 which is a castable insulation, many of which are available on the open market, such as Resco RS-7. The refractory layer 62 is also included which preferably is a castable refractory layer formed of hexmesh and refractory material, many of which are commercially available, such as Resco RA-22 and which is spaced from the outer body whell 56 by a series of T-shaped standoffs 61.

Similarly, the valve surface portion 64 of the slide valve cooperating with the valve surface 20 is also a refractory material, such as hexmesh and refractory, as is the inner wall member 66 of the flow passage 22 in order to withstand the high temperatures and erosion encountered in high pressure, high temperature, erosive, solid or fluid flow in refinery valves.

Also disposed in the passageway are a pair of purge and lanceports 68 and 70 for purging and cleaning out the flow passage 22 through the valve body 12, which parts are normally closed by caps, not shown.

Preferably and as illustrated in FIG. 2, the slides 48 and guides 50 are hard-faced or lined with a hard material, such as Tapco 6, a commercial hardfacing, as indicated by the reference numerals 49 and 51, respectively, to provide wear resistant surfaces.

Referring now to FIGS. 4 and 5, which illustrate a modification, and in which the reference letter a has been added to designate parts corresponding to those of FIGS. 1-3, the primary difference is that the cylindrical body portion 48 projecting into the passage 22a is shortened and the valve member 20a having the valve surface is releasably connected to the projecting portion 48a, such as means of the bolts 21 so that the valve member 20a having the valve surface 20a also is removable for replacement and repair through the opening normally closed by the removable cover or bonnet 14.

Also, in this embodiment, the guides 50 are in the form of inwardly turned arms which slide against the surfaces of the projections 48a, as illustrated. This effectively puts the guides and slides away from and out of the direct flow path of high pressure, high temperature, erosive flow through the flow passage 22a. Thus, the wear-prone valve components are readily removable through the bonnet opening.

The other parts, mode of operation and assembly are the same as those indicated with respect to FIGS. 1-3 and, accordingly, no more description thereof is deemed necessary or given.

Referring now to FIG. 6, a further modification is illustrated in which the reference letter b has been added to numerals corresponding to those of the preceding figures, and in which a pair of slide valves 18b are provided with associated cylinders 24b, pistons 26b, piston rods or stems 28b for moving the slide valve members 18b into and out of closed and open position for closing and opening the flow passage 22b through the valve body 10b. When closed, the two slide valves 18b, which are arranged in end-to-end relationship with respect to one another and which are guided in their sliding motion in the same plane by the interfitting guides and slides as previously mentioned, meet in the middle portion of the flow passage 22 for closing the valve and are in the position illustrated in FIG. 6 for opening and flow passage of 22b. All other parts, assembly and mode of operation are the same as described in connection with the preceding FIGS. 1-5, and, accordingly, no more description thereof is deemed necessary or given.

Preferably, the body of the valve includes an inner shell 55 and an outer shell 57 (FIGS. 1-4, 55a and 57a in FIGS. 5 and 6, and 55b and 57b in FIG. 6) to provide a space for the insulation 58. A compartment is disposed adjacent and under the bonnet or cover 14 into which is removably disposed additional insulation 78 to prevent transmission of heat to the bonnet or cover 14. To assist in locating this additional insulation, the spacing bolts 72 are provided as illustrated in FIG. 6 and are covered by the cover plates 74 to keep the bolt heads free from metallizing and solids buildup. In addition, this arrangement provides for a removable bearing sleeve 76b and the removable insulation assembly 78b — (78 in FIG. 1) so that these wear-prone parts can be removed through the valve bonnet opening and without the necessity of removing the entire valve from the line when these parts need repairs or replacement.

The present invention, therefore, is well suited and adapted to attain the objects and ends and has the advantages and features mentioned as well as others inherent therein. While presently-preferred embodiments of the invention have been given for the purpose of disclosure, changes in details and arrangement of parts may be made which are within the spirit of the invention as defined by the scope of the appended claims.

What is claimed is:

1. A guided slide valve comprising,
 a body provided with a flow passage therethrough, including an enlarged internal portion,
 a body portion connected at one end to the body and having a projecting portion extending into the enlarged internal portion, the projecting portion having its sides spaced from internal walls of the enlarged internal portion thereby forming a transverse space on each side of the projecting portion out of direct flow through the flow passage,
 a valve seat secured on the projecting portion,
 a slide valve slidable in the enlarged internal portion adjacent the valve seat and having spaced side members extending around the sides of the projecting body portion and disposed in the transverse space,
 interfitting guides and slides operable for guiding the slide valve into open and closed positions adjacent the valve seat,
 the guides being disposed in the transverse space and on the sides of the projecting body portion,
 the interfitting slides being disposed on the side members,
 the side members, guides and slides, being spaced from the internal walls of the enlarged internal portion and out of the direct flow through the flow passage,
 whereby the side members, interfitting guides and slides being out of direct contact with the body thereby permit external settable clearances between the valve seat and the slide valve which remain fixed under temperature or pressure excursions,
 the body provided with an opening of a size permitting insertion in and withdrawal from the body of the slide valve, the side members and the slide therethrough, and
 a removable cover closing the opening 2. The guided slide valve of claim 1 where, the body portion is a cone having a cylindrical portion forming the projecting portion.

3. The guided slide valve of claim 1 where, the body portion is a cone having a cylindrical portion forming the projecting portion, and the cone is suspended from the body in an external load-free relationship with respect to the body.

4. The guided slide valve of claim 1 where, the valve seat is releasably secured to the projecting portion.

5. The guided slide valve of claim 1 where, the body portion is a cone having a cylindrical portion forming the projecting portion, and the valve seat is releasably secured to the projecting portion.

6. The guided slide valve of claim 1 where, the body portion is a cone having a cylindrical portion forming the projecting portion,
 the cone is suspended from the body portion in an external load-free relationship with respect to the body, and
 the valve seat is releasably secured to the projecting portion.

7. The guided slide valve of claim 1 where, the guides comprise parallel projections extending from the sides of the projecting portion, and the side members are provided with grooves which form the slides interfitting with the guides.

8. The guided slide valve of claim 1 where, the guides comprise parallel projections extending from the sides of the projecting portion, the side members have grooves which form the slides interfitting with the guides, and the valve seat is releasably secured to the projecting portion.

9. The guided slide valve of claim 1 where, the slide valve comprises a pair of slide valves disposed in end-to-end relationship with respect to each other for opening and closing the valve.

10. The slide valve of claim 1 including a bearing sleeve removably secured to the body, and an actuator stem movably extending through the bearing sleeve and secured to the slide valve operable to actuate the slide valve to open and closed positions.

11. The slide valve of claim 1 where, the body includes an outer shell and an inner shell to provide an insulation space about the flow passage, the enlarged internal portion and substantially all of the projecting portion and the valve seat, and includes an insulating compartment adjacent the removable cover and including,
 insulating material disposed in the insulation space,
 additional insulation material removably disposed within the insulating compartment,
 the removable cover including an opening,
 a bearing sleeve removably disposed in the insulating compartment in communication with the opening and the slide valve, and
 an actuator stem movably extending through the opening and the bearing sleeve and secured to the slide valve operable to actuate the slide valve to open and closed positions.

12. A guided slide valve comprising,
 a body provided with a flow passage therethrough including an enlarged internal portion,
 a cone suspended in the body and having a cylindrical projecting portion extending into the enlarged internal portion and forming a transverse space on each side of the projecting portion out of contact with the body and out of direct flow through the flow passage,
 a valve seat on the cylindrical portion,
 a slide valve slidable in the enlarged internal portion and having transversely spaced side members extending around sides of the cylindrical portion and disposed in the transverse space in the enlarged internal portion out of contact with the body and out of the direct flow through the flow passage,
 transversely spaced external projections on opposite sides of the cylindrical portion forming guides,
 the side members having slides interfitting with the guides, whereby the valve seat, side members, interfitting guides and slides are out of direct contact with the body permitting external settable clearances between the valve seat and the slide valve which remain fixed under temperature or pressure excursions, the body provided with an opening of a size permitting insertion in the withdrawal from the body of the slide valve, the side members and the slides therethrough, and a removable cover closing the opening.

13. The guided slide valve of claim 12 where,
the valve seat is releasably secured to the cylindrical portion.

14. The guided slide valve of claim 12 where,
the slide valve comprises a piar of slide valves disposed in end-to-end relationship with respect to one another for opening and closing the valve.

15. The slide valve of claim 12 including,
a bearing sleeve removably secured to the body, and
an actuator stem movably extending through the bearing sleeve and secured to the slide valve for actuating the slide valve to open and closed positions.

16. The slide valve of claim 12 where,
the body includes an outer shell and an inner shell to provide an insulation space about the flow passage and the enlarged internal portion and includes an insulating compartment adjacent the removable cover, insulating material disposed in the insulation space,
additional insulation material removably disposed within the insulating compartment,
the removable cover provided with an opening,
and including,
a bearing sleeve removably disposed in the insulating compartment in communication with the opening and the slide valve, and
an actuator stem movably extending through the opening and the bearing sleeve and secured to the slide valve for actuating the slide valve to open and closed positions.

* * * * *